C. D. PLATT.
METER TESTING SWITCH.
APPLICATION FILED NOV. 17, 1919.
1,365,725.
Patented Jan. 18, 1921.
2 SHEETS—SHEET 1.
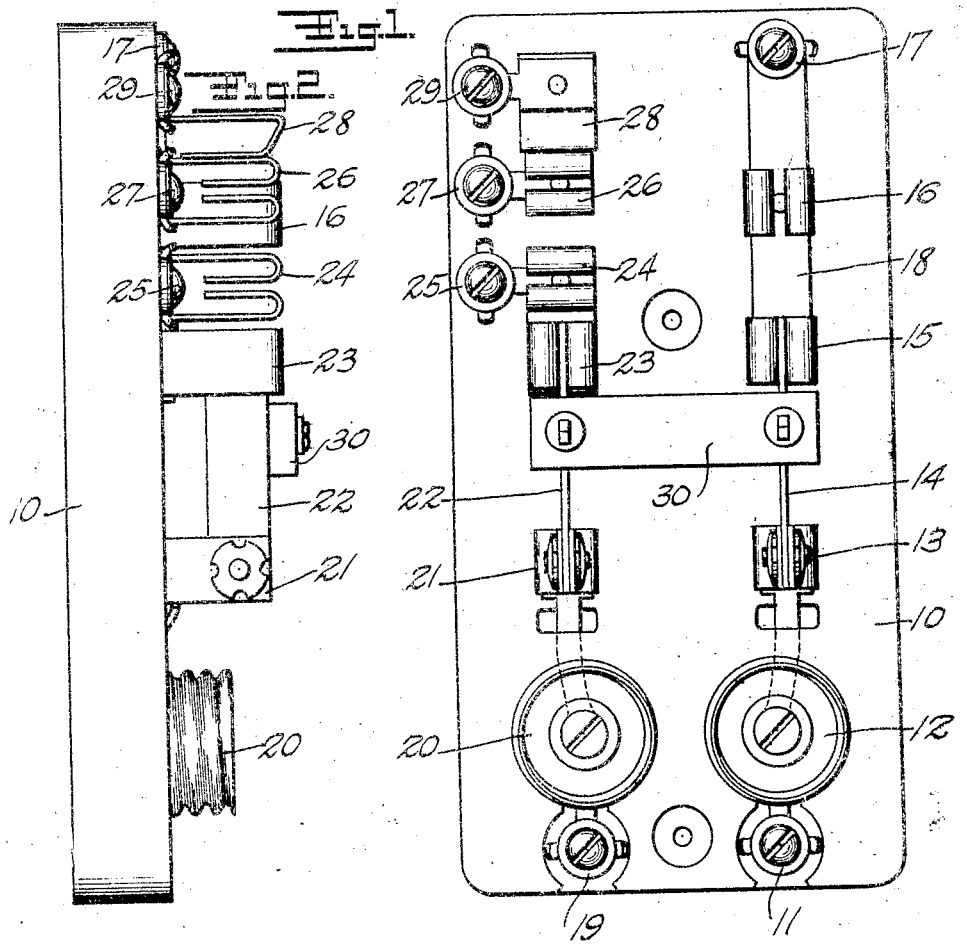
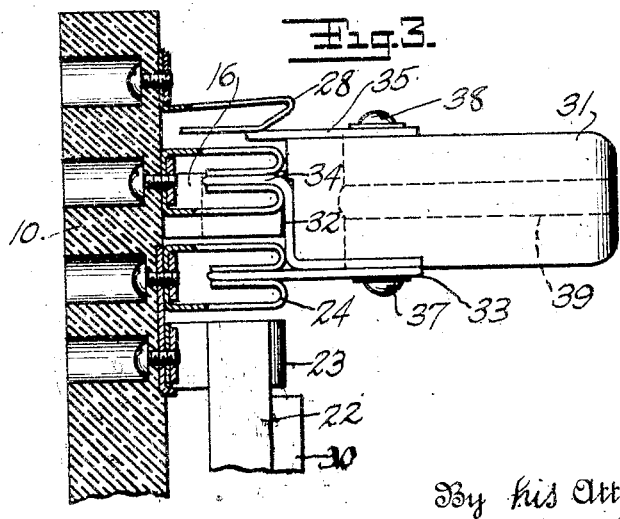
Inventor
C. D. Platt
By his Attorneys

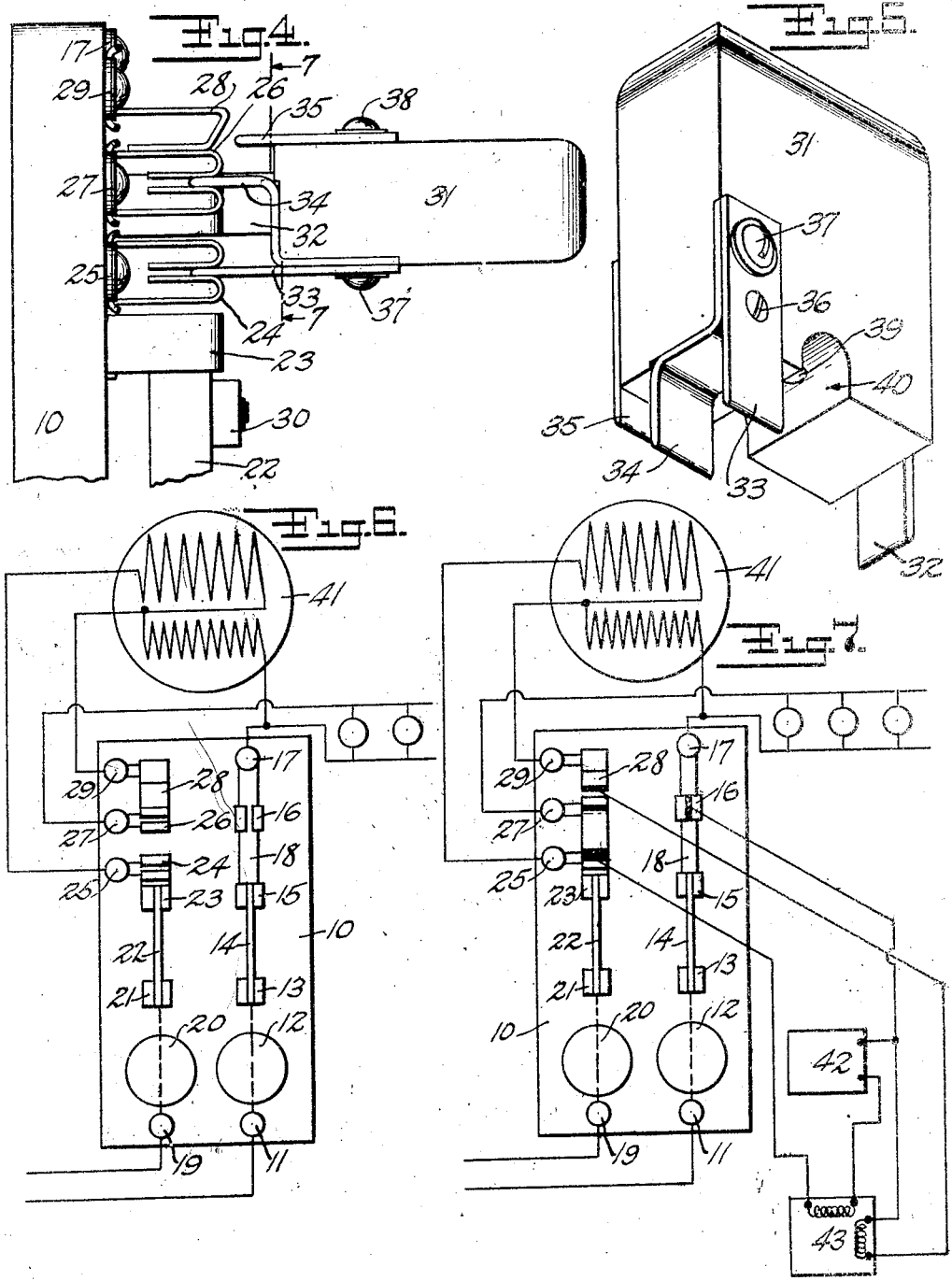

UNITED STATES PATENT OFFICE.

CLARENCE D. PLATT, OF BRIDGEPORT, CONNECTICUT.

METER-TESTING SWITCH.

1,365,725.   Specification of Letters Patent.   Patented Jan. 18, 1921.

Application filed November 17, 1919.   Serial No. 338,644.

*To all whom it may concern:*

Be it known that I, CLARENCE D. PLATT, a citizen of the United States of America, residing at Bridgeport, Connecticut, have invented a new and useful Meter-Testing Switch, of which the following is a specification.

My invention relates particularly to a construction adapted to be used as an entrance switch with connections for a meter and means for disconnecting the meter from the local circuit and placing it in circuit with testing instruments without interrupting the service.

The main object is to provide a simple, compact and inexpensive construction by which the meter testing operation may be carried out by a simple operation which cannot be improperly performed and which will insure the leaving of the switch in its proper circuit relation when the meter testing operation is completed.

In its preferred form the invention contemplates the combination of a double-bladed switch with a special arrangement of plug sockets and terminals together with a special plug. To connect the testing instruments it is simply necessary to insert the plug in the sockets of the switch which action automatically disconnects the meter from the local circuit and places it in circuit with the testing instruments. The removal of the plug automatically restores the circuits to their normal operating condition.

Figure 1 is a plan view of a switch embodying the improvements of my invention.

Fig. 2. is is a side view of the same taken from the left of that of Fig. 1.

Fig. 3, is a partial vertical sectional view of the upper end of the switch and showing the plug in position.

Fig. 4, is a side view showing the plug being inserted.

Fig. 5, is a perspective view of the plug.

Fig. 6, is a diagrammatic view showing the circuit connections from the main line through the switch and meter to the local circuit when the parts are in the normal operating position.

Fig. 7, is a similar view showing the particular relation when the meter testing instruments are connected, the plug blades being shown in section on the plane of the line 7—7 of Fig. 4.

Although such switches are usually inclosed I have not illustrated the box as the invention resides in the switch construction.

Preferably the parts are all carried by an insulating base 10. In the particular arrangement herein shown the elements arranged alongside of the base are the line terminal 11, fuse plug socket 12, hinge post 13, blade 14, contact 15, plug socket 16 and terminal 17. A strip 18 electrically connects the contact 15, socket 16 and terminal 17.

The other side of the switch has a line terminal 19, fuse plug socket 20, hinge post 21, blade 22, contact 23, plug socket 24 with its terminal 25, plug socket 26 with its terminal 27 and auxiliary contact 28 with its terminal 29. Contact 23 and socket 24 are electrically connected together and contact 28 is normally in contact with socket 26. For convenience in operating, the two blades 14 and 22 are preferably connected by an insulating cross bar 30. Terminal 17 is adapted to be connected to the local or load circuit and to the meter. Terminal 27 is adapted to be connected to the local or load circuit and terminals 25 and 29 are adapted to be connected to the meter.

The plug consists of an insulating body or block 31 carrying the blades 32, 33, 34 and 35. Each blade is secured to the block for instance, by means of a screw such as 36. The two blades 33 and 34 have a common binding screw 37. Each of the blades 32 and 35 has a binding screw such as 38. The block 31 is provided with a central passage 39 for the wires of the testing instruments. A cross channel 40 may be provided through which the individual ends of the three wires of the testing instruments are led. 41 indicates a meter and 42 and 43 represent the testing instruments.

When the switch is in the normal running position one branch of the main leads from terminal 11 through the fuse plug in socket 12 then to the hinge post 13, blade 14, contact 15 and strip 18 to the local circuit terminal 17. The other side of the main is connected to the terminal 19 from which the circuit passes through the block in socket 20, thence to the hinge post 21, blade 22, contact 23, terminal 25 through the meter 41, thence to terminal 29, contact 28, socket 26 and terminal 27 to the other side of the load circuit.

When the meter is to be tested the plug is inserted with blades 32, 33 and 34 respectively in the sockets 16, 24 and 26, as shown in Fig. 4. As the plug is pushed in, the blade 35 engages the contact 28 which is inclined at its outer end so that it may be forced away from the contact socket 26 as the blade 35 enters. The separation of the contact 28 from contact socket 26 cuts out the main meter circuit but leaves the meter in circuit with the testing instruments. It will be noted however that the load circuit it not interrupted since it is merely diverted through the blade 33 to blade 34.

I claim:—

1. In a meter testing switch, three plug sockets and an auxiliary contact normally engaging one of said sockets, said socket being adapted to be connected to a load circuit, the auxiliary contact being adapted to be connected to a meter, one of the other sockets being adapted to be connected to the load circuit and to the meter and the remaining socket being adapted to be connected to the meter in combination with a plug having four blades three of which are adapted to engage said sockets and the other of which is adapted to engage the auxiliary contact and separate it from the socket adjacent thereto.

2. In a meter testing switch, three sockets, a member normally in contact with one socket, load circuit and meter terminals connected to said sockets and member, a plug having depending arms to engage said sockets and permit the current to flow to the load circuit without passing through the meter, and another arm on said plug which upon further depression of the plug disengages said member from its adjacent socket and connects the meter to testing instruments.

3. In a meter testing switch, load circuit and meter terminals, means of connection between one load circuit terminal and one meter terminal, plug contacts connected with said terminals and a plug for co-acting with said contacts comprising a block, two depending connected arms fastened to said block, a third arm at right angles to the first named arms, and a shorter arm parallel to the first mentioned arms, for the purpose described.

4. In a meter testing switch, the combination of two meter terminals, a load terminal, and a common terminal, plug contacts connected to each of said terminals, one of said meter terminal contacts normally engaging said load terminal contact but adapted to be disengaged by a plug.

5. In a meter testing switch, the combination of two meter terminals, a load circuit terminal, and a common terminal, three plug contacts electrically connected respectively with said load circuit terminal, one of said meter terminals and said common terminal, and a switch member normally connecting the other meter terminal with said local circuit terminal and adapted to be retracted by engagement of a testing plug and adapted to automatically return upon disengagement of the testing plug.

6. In a construction of the character described, a double bladed switch, a combined meter terminal and plug contact connected to one side of the switch, a load circuit terminal and contact adjacent thereto, a meter terminal and connected spring contact normally engaging said last mentioned contact, and a common meter and load circuit terminal and plug contact electrically connected with the other side of said switch.

7. In a construction of the character described, a main two bladed entrance switch and stationary switch contacts, a meter terminal and plug contact connected to one of said stationary switch contacts, a load line terminal and plug contact, a second meter terminal and connected spring contact mounted adjacent said load terminal and plug contact and normally engaging the latter, a third plug contact electrically connected to another of said stationary switch contacts, and a meter and another load line terminal connected to said third plug contact, each of said plug contacts being engageable by a plug and said spring contact being adapted to be moved out of engagement with its plug contact by means of a plug.

8. In a meter testing switch, a base, a meter terminal and connected plug contact on said base, a load line terminal and connected plug contact on said base, a second meter terminal on said base, a spring contact connected to said last mentioned meter terminal normally connected with said load line terminal, a third plug contact connected to the meter and to another load line, each of said plug contacts being adapted to be engaged by a plug and to have said spring contact and load line terminal disconnected thereby.

9. In a meter testing switch, two main terminals, a plug contact and meter and load terminal means connected to one of said main terminals, a plug contact and meter terminal connected to the other main terminal, a third plug contact and a load terminal, a meter terminal and a connected spring plug contact normally engaging said third plug contact but adapted to be disengaged by the insertion of a plug.

CLARENCE D. PLATT.